March 25, 1941.    M. KATCHER    2,236,062
KNUCKLE JOINT
Filed June 27, 1939    2 Sheets-Sheet 2

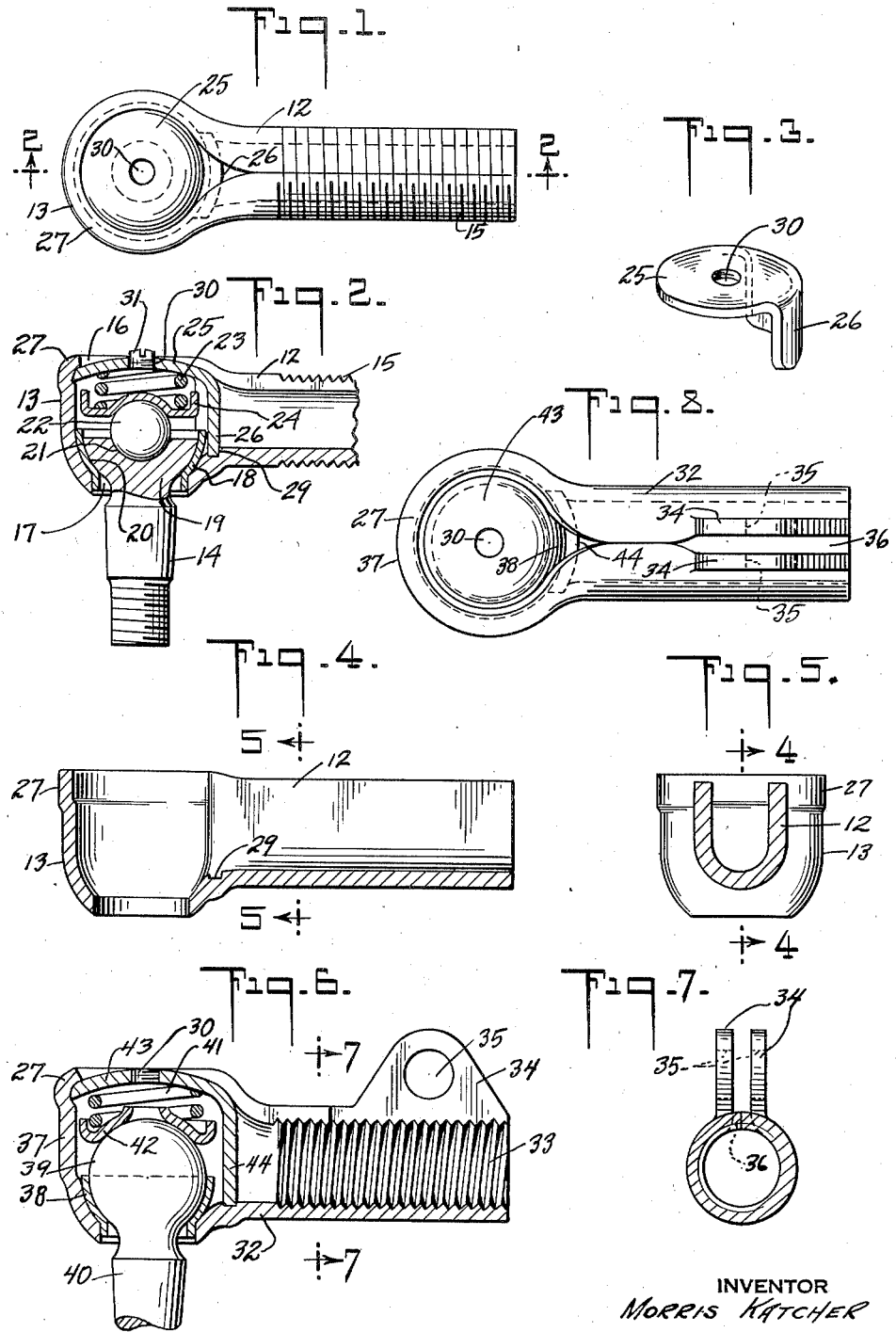

INVENTOR
MORRIS KATCHER.
BY
Emanuel Scheyer
ATTORNEY

Patented Mar. 25, 1941

2,236,062

UNITED STATES PATENT OFFICE 2,236,062

KNUCKLE JOINT

Morris Katcher, New York, N. Y.

Application June 27, 1939, Serial No. 281,321

3 Claims. (Cl. 287—90)

This invention relates to a joint assembly providing limited universality of movement and is particularly adapted for a steering knuckle joint for use in the tie rod and drag link connections of automotive vehicles.

It is an object of this invention to provide a joint which is automatically self-adjusting to compensate for wear and in which the parts are so shaped and frictionally held to each other that lost motion and rattling is effectively prevented.

In my preferred form, the shank of the joint together with the housing for the head of the stud, are formed from a one piece sheet metal stamping. The head of the stud and its accompanying parts are inserted into the housing and retained therein by an inset, said inset having a tail which closes off the housing from the hollow interior of the shank, confining the lubricating grease to the housing. In one form, the housing has a pair of oppositely disposed holes through one of which the stud and its accompanying parts are inserted in assembling, the shaft of the stud projecting through the other hole, the inset closing off the former hole and the interior of the shank. In another form, the housing has only one opening into which the stud and its accompanying parts are inserted and through which the shaft of the stud projects, the inset keeping the parts in the housing and closing off the interior of the shank.

Another feature of my invention is the use of a bushing in the sheet metal shank and housing which extends into the interior of the housing away from the wall of the housing to provide an adequate support for the head of the stud. Where a solid shank is used as in my copending applications Serial Nos. 188,222 and 213,125, which have matured into Patents Nos. 2,178,206 and 2,197,889 the bushing is used always as a liner for the metal of the housing and shank, but where these are made of sheet metal there is not enough metal to serve as a backing for the bushing, so the latter itself must provide the support for the head.

In another form I provide a bushing, spring mounted in the housing, the bushing supporting the head and reacting with the spring to pull the stud into the housing. The head has a thrust against the top of the housing, either directly or through a ball bearing, and in each case an anti-friction liner is used inside the top of the housing to take the wear from the thrust. Both the bushings noted above are preferably of anti-friction material.

Other objects and advantages will become apparent upon further study of the description and drawings in which—

Fig. 1 is a plan of one form of knuckle joint in which the end of the shank is externally threaded.

Fig. 2 is a partial section taken along the line 2—2 of Fig. 1, a screw being shown closing the grease hole.

Fig. 3 is perspective view of the inset shown by itself.

Fig. 4 is a section through a partially formed blank for the shank and the housing taken along the line 4—4 of Fig. 5.

Fig. 5 is a section taken along the line 5—5 of Fig. 4.

Fig. 6 is a section of another form of knuckle joint in which the shank is internally threaded and has integral ears, a portion of the stud being broken away.

Fig. 7 is a section taken along the line 7—7 of Fig. 6.

Fig. 8 is a plan view of the knuckle joint of Fig. 6.

Figure 9:
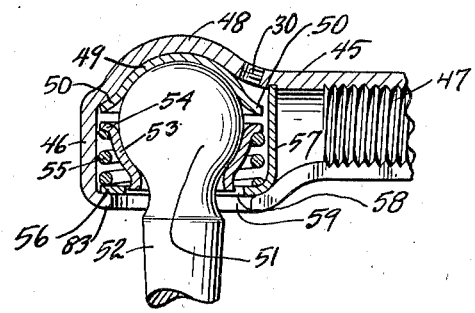
Fig. 9 is a partial section of another form of knuckle joint.

The knuckle joint of Figs. 1-5 comprises a sheet metal shank 12 formed of a single piece of sheet metal. The shank is externally threaded at its end 15, at which end it is in the form of a hollow cylinder. Where this knuckle joint is used in connection with the steering mechanism of an automobile, as is well known to the art, shank 12 is connected to one end of the tie rod, not shown, the latter having a hollow internally threaded end to take the threaded end 15. The other end of said shank is formed into a housing 13 having an opening 16 at its top and an oppositely disposed opening 17 at its bottom. Fixedly fitting in housing 13 at and above opening 17 is a bushing 18 of anti-friction material. A suitable anti-friction material is brass or phosphor-bronze. The upper portion of bushing 18 has a spherical internal bearing surface 20 in which is universally mounted head 19 of stud 14, the outer surface of said head in contact with the bushing being spherical and concentric with the spherical internal bearing surface 20. The upper portion of bushing 18 on the side toward the hollow interior of shank 12, right side in Fig. 2, extends up clear of housing 18 acting as a continuation of the housing for the support of head 19. The top of head 19 is flat except for a substantially hemispherical depression or socket 21. The center of the sphere, of which depression 21 is a segment, is in axial alignment with the longitudinal axis of stud 14. Mounted in depression 21 is a ball bearing 22. Compression spring 23 presses socket cap 24 down on ball bearing 22, the upper end of said spring reacting against the inside face of inset 25. The sides of cap 24 are clear of housing 13 and tail 26 forming part of inset 25. The opening 17 at the lower end of housing 13 is sufficiently large and bushing 18 sufficiently flared out to permit a limited amount of swinging of stud 14 about the center of ball bearing 22 as a pivotal axis. The pressure of spring 23 produces a certain desirable amount of friction between head 19 and the inside of bushing 18 which prevents rattling and lost motion. Further, said pressure moves the parts together to take up for wear.

The partially formed blank of Figs. 4 and 5 is first bent into the form of shank 12 shown in Figs. 1 and 2 except that lip 27 is left upstanding. The tubular end 15 is then threaded. Bushing 18 is then forced into position in the lower portion of housing 13, said bushing being inserted into the housing through top opening 16, inset 25 not yet being put in. Stud 14 is inserted, with its threaded end 28 first, through top opening 16, until its head 19 nests in bushing 18. Ball bearing 22, socket cap 24 and spring 23 are next put in, inset 25 being used to hold down said spring. The bottom of tail 26 is set in groove 29 formed in shank 12. Lip 27 is then peened or spun over to retain inset 25 in its position in housing 13. A grease opening 30 is provided in the top of inset 25. A pressure grease fitting can be set in this hole and grease forced into the housing. In Fig. 2, opening 30 is shown closed by a screw 31. Tail 26 prevents the grease in housing 13 from entering the hollow interior of shank 12 and also prevents, together with the rest of inset 25, the loss of grease from the top of said housing.

In the modification shown in Figs. 6, 7 and 8, the one-piece sheet metal shank 32 is internally threaded at 33 and is provided with integral upstanding ears 34. Where this joint is used with the steering mechanism of an automobile, as is well known to the art, shank 32 is connected to one end of the tie rod, not shown, the latter having an externally threaded end to take the thread 33. Once the tie rod is screwed into the shank, a bolt, not shown, is passed through openings 35 in ears 34 and the latter pulled up tight, slot 36 allowing for give. Housing 37 is formed on the end of shank 32. In housing 37 is set bushing 38, of anti-friction material, having a spherical internal bearing surface in its upper portion in which the spherical head 39 of stud 40 is slidably mounted for universal motion. As with bushing 18 of Fig. 2, bushing 38 on the side toward the hollow interior of shank 32, right side in Fig. 6, extends up clear of housing 37 acting as a continuation of said housing for the support of head 39. Compression spring 41 presses socket cap 42 down on head 39, the upper end of said spring reacting against the inside face of inset 43. The sides of socket cap 42 for all angular positions of stud 40, remain clear of the inside of the housing and tail 44 forming part of inset 43. The functions of socket cap 42, spring 41, bushing 38, oil hole 30, flange 27 and inset 43 are similar to those of the corresponding parts described in connection with Fig. 2. Also the method of assembling and forming are similar to that of the joint of Fig. 2.

The two types of joint described above have in common a housing with openings at opposite ends. The stud and the other parts of the joint are inserted through one of these openings with the shaft of the stud projecting out the other of said openings. Also the spring for retaining the head of the stud in position forces the head of the stud toward the opening from which its shank projects. In the modifications about to be described, there is only one opening in the housing which serves both for the insertion of the stud and the other parts of the joint as well as for the projection of the shaft of the stud. Also the spring for retaining the head of the stud in position forces the head of the stud away from this opening.

The joint of Fig. 9 comprises a sheet metal shank 45 formed of a single piece of sheet metal into a hollow cylinder 47 and threaded at one end while the other end is shaped into a housing 46. The top of housing 46 is domed at 48 and has inside of it an anti-friction liner 49 with a spherical inner bearing surface. The lower end of liner 49 has a flare 50 to prevent its swinging about in housing 46 and also to facilitate the entrance of grease between the liner and head 51. The head 51 of stud 52 has a spherical surface in bearing contact with the inner bearing surface of liner 49, while its shaft projects out through opening 59 of housing 46. Mounted on the lower portion of head 51 is anti-friction bushing 53. The inside bearing surface of bushing 53 is spherical and fits the contacting outer surface of head 51. The upper edge of bushing 53 has a flange 54 against which spring 55 reacts upward, the lower end of said spring bearing against the inside face of inset 56. The action of spring 55 is yieldably to hold head 51 up against liner 49. Inset 56 is provided with a tail 57 to hold in the grease as described above for the other types. Inset 56 has an opening 58 just inside opening 59 in housing 46. Both of said openings are large enough to permit a limited universal motion of stud 52 relative to housing 46.

Figure 10:
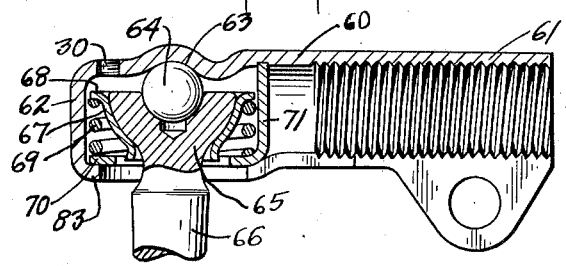
Fig. 10 is a partial section of still another form of knuckle joint.

The joint of Fig. 10 comprises a sheet metal shank 60 formed of a single piece of sheet metal into a hollow cylinder 61 and threaded at one end while the other end is shaped into a housing 62. The top of housing 62 has a spherical recess 63 into which fits the top of ball bearing 64. Head 65 of stud 66 has a flat top and spherical sides. The flat top of head 65 has a spherical depression into which fits the bottom of ball bearing 64. An anti-friction bushing 67, having a spherical interior bearing surface engages the complementary spherical bearing surface of head 65. The upper edge of bushing 67 has a flange 68 against which spring 69 reacts upward, the lower end of said spring bearing against the inside face of inset 70. The action of spring 69 is yieldably to hold head 65 up against ball bearing 64. Inset 70 is provided with a tail 71 for the purpose described above for the tails of other types.

Figure 11:
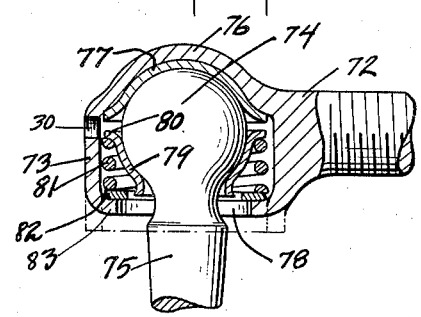
Fig. 11 is a partial section of another form in which the shank is an externally threaded forging.

The joint of Fig. 11 comprises a forged shank 72 having a housing 73 formed at one end. The mounting of head 74 of stud 75 in housing 73 is in general similar to that shown for Fig. 9. The top of housing 73 is domed at 76 and has inside of it an anti-friction liner 77 with a spherical inner bearing surface. The head 74 has a spherical surface in bearing contact with the inner bearing surface of liner 77, while its shaft projects out through opening 78 of housing 73.

Mounted on the lower portion of head 74 is antifriction bushing 79. The inside bearing surface of bushing 79 is spherical and fits the contacting surface of head 74. The upper edge of bushing 79 has a flange 80 against which spring 81 reacts upward, the lower end of said spring bearing against the inner face of washer 82.

Before inserting the heads of the studs and cooperating parts in the housings 46, 62 and 73 of Figs. 9, 10 and 11, the lower edge of said housings extends straight down as shown by the dot and dash lines at the bottom of housing 73 in Fig. 11. When the head 74 of stud 75, together with liner 77, bushing 79, spring 81 and washer 82 are inserted in housing 73, the lower edge of said housing is peened or spun over to form retaining flange 83. Similar flanges, similarly numbered, are formed on housings 46 and 62 of Figs. 9 and 10 respectively.

The housings of Figs. 9, 10 and 11 are each provided with a threaded oil hole 30.

The bushings 18 and 33 of Figs. 2 and 6 respectively are helped in being kept fixedly in their positions in their housings due to the friction developed by the natural roughness of their unfinished exteriors where they come into contact with the unfinished interiors of the housings. This holds true also for the liners 49 and 77 of Figs. 9 and 11 respectively. Said friction is much greater than that developed between the moving parts and the finished interior of the bushings or linings.

I claim:

1. A joint comprising a housing having an aperture at one side and a hollow shank extending from the housing at another side substantially at right angles to the first side with an opening between the interior of the housing and the interior of the shank, a stud extending through said aperture and having a bearing surface within said housing, a bushing in direct contact with the wall of the housing at one end, at the other end projecting into the housing opposite and only part way across said opening and away from the wall of said housing, said bushing having an inner bearing surface conforming with the bearing surface of the stud, means constantly urging said bearing surfaces into bearing relationship with each other, and an inset placed in the housing retaining the stud in the housing, said inset having a tail closing off said opening.

2. A joint comprising a socket having apertures at opposites sides thereof, a hollow shank extending from the socket at an opening in another side of the socket, the hollow interior of the shank being open to the interior of the socket, a member having a head in the socket and a shaft extending out of the socket through one of said apertures, dampening means for mounting the head of the stud in the housing, said member and dampening means being insertible into their position in the socket through the other of said apertures, and an inset coming over said other aperture, said inset having a tail of a width substantially equal to that of the opening, being set at the opening, separating the interior of the socket from the interior of the shank.

3. A joint comprising a housing having apertures at opposite sides thereof, and a hollow shank extending from the housing at another side substantially at right angles to said first sides with an opening between the interior of the housing and the interior of the shank, a member extending through one of said apertures and having a bearing surface within said housing, a bushing at one of its ends in direct contact with the wall of the housing at said one of the apertures, the other end of the bushing projecting into the housing opposite and only part way across said opening and away from the wall of said housing, said bushing having an inner bearing surface conforming with the bearing surface of the stud, means constantly urging said bearing surfaces into bearing relationship with each other, and an inset placed in the housing at said other aperture retaining the stud in the housing, said inset having a portion closing off said opening.

MORRIS KATCHER.